(12) United States Patent
Beck

(10) Patent No.: US 11,845,565 B2
(45) Date of Patent: Dec. 19, 2023

(54) AIRCRAFT REFUELLING DEVICE AND METHOD FOR MANUFACTURING A WING COUPLING FOR SUCH A DEVICE

(71) Applicant: DESAUTEL, Lyons (FR)

(72) Inventor: Claude Beck, Bordeaux (FR)

(73) Assignee: DESAUTEL, Lyons (FR)

( * ) Notice: Subject to any disclaimer, the term of this patent is extended or adjusted under 35 U.S.C. 154(b) by 644 days.

(21) Appl. No.: 16/978,682

(22) PCT Filed: Mar. 5, 2019

(86) PCT No.: PCT/EP2019/055443
§ 371 (c)(1),
(2) Date: Sep. 5, 2020

(87) PCT Pub. No.: WO2019/170671
PCT Pub. Date: Sep. 12, 2019

(65) Prior Publication Data
US 2020/0399001 A1    Dec. 24, 2020

(30) Foreign Application Priority Data

Mar. 6, 2018 (FR) ...................................... 1851927

(51) Int. Cl.
*B64F 1/28* (2006.01)
*B64D 37/02* (2006.01)
(Continued)

(52) U.S. Cl.
CPC ................ *B64F 1/28* (2013.01); *B64D 37/02* (2013.01); *B64D 37/16* (2013.01); *B64F 5/10* (2017.01)

(58) Field of Classification Search
CPC ... B64F 1/28; B64F 5/10; B64D 37/02; B64D 39/06; B64D 37/16
See application file for complete search history.

(56) References Cited

U.S. PATENT DOCUMENTS 6,341,629 B1 * 1/2002 Clark ................. G01N 33/2829
141/59
8,763,956 B2 * 7/2014 Beck ........................ B64F 1/28
340/611

(Continued)

FOREIGN PATENT DOCUMENTS

CN         1242834 A    1/2000
CN       102421669 A    4/2012
(Continued)

OTHER PUBLICATIONS

INPI Rapport de Recherche Préliminaire for Patent Application No. FR 1851927, Feb. 1, 2019, 2 pp.
(Continued)

*Primary Examiner* — Rodney A Bonnette
(74) *Attorney, Agent, or Firm* — Soquel Group LLC

(57) ABSTRACT

Aircraft refuelling device including a fuel circulation pipe of which the downstream end is equipped with a wing coupling for connecting it to an inlet orifice of a fuel tank of the aircraft. The wing coupling includes a body which defines a fuel circulation duct at the end of the pipe, a sensor for measuring the value of a parameter indicative of a flow of fuel passing through the wing coupling, and at least one battery electrically powering the sensor. The sensor and the electrical power supply battery are housed in two half-shells mounted together around the body of the wing coupling.

11 Claims, 8 Drawing Sheets

(51) Int. Cl.
*B64D 37/16* (2006.01)
*B64F 5/10* (2017.01)

(56) References Cited

U.S. PATENT DOCUMENTS

| | | | | |
|---|---|---|---|---|
| 11,174,040 | B2* | 11/2021 | Beck | B67D 7/04 |
| 2009/0315729 | A1* | 12/2009 | Inhoffer | B64F 1/28 |
| | | | | 340/632 |
| 2016/0362195 | A1* | 12/2016 | Wilkinson | B67D 7/04 |
| 2020/0399000 | A1* | 12/2020 | Beck | B64F 1/28 |

FOREIGN PATENT DOCUMENTS

| | | |
|---|---|---|
| EP | 0935750 A1 | 8/1999 |
| EP | 2952434 A1 | 12/2015 |
| RU | 133510 U1 | 10/2013 |
| RU | 2538479 C2 | 1/2015 |
| WO | 2008121325 A1 | 10/2008 |
| WO | 2010128246 A2 | 11/2010 |

OTHER PUBLICATIONS

International Search Report for Patent Application No. PCT/EP2019/055443, dated Apr. 29, 2019, 2 pp.
WO1998020342A1 Equivalent to Publication No. EP0935750A1, Pub date May 14, 1998.

\* cited by examiner

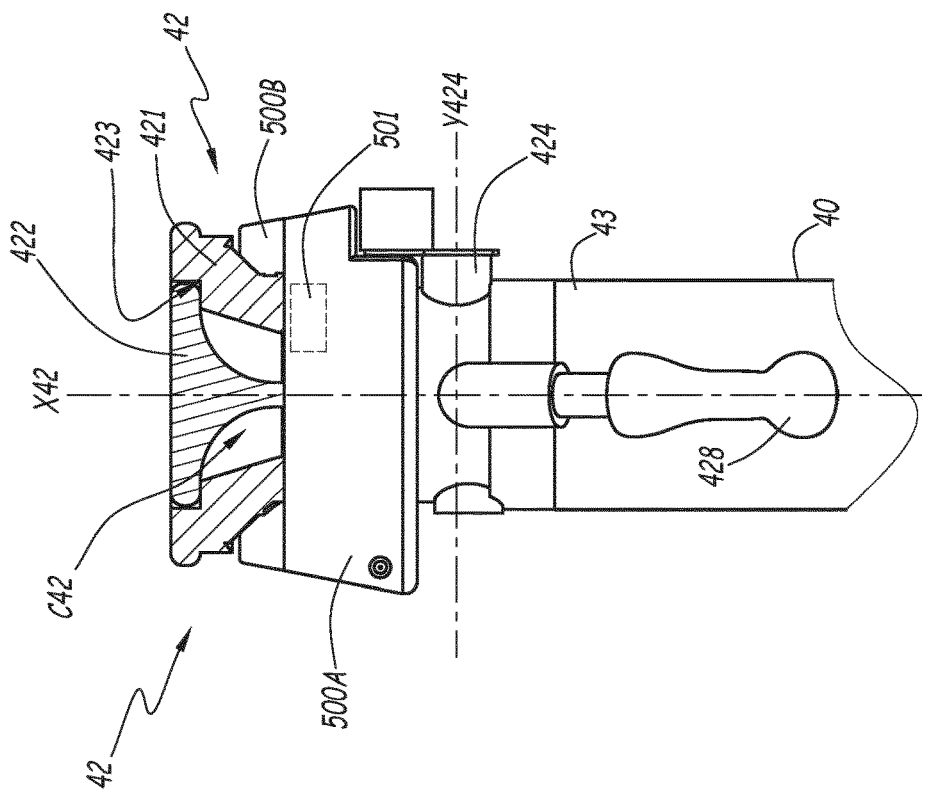
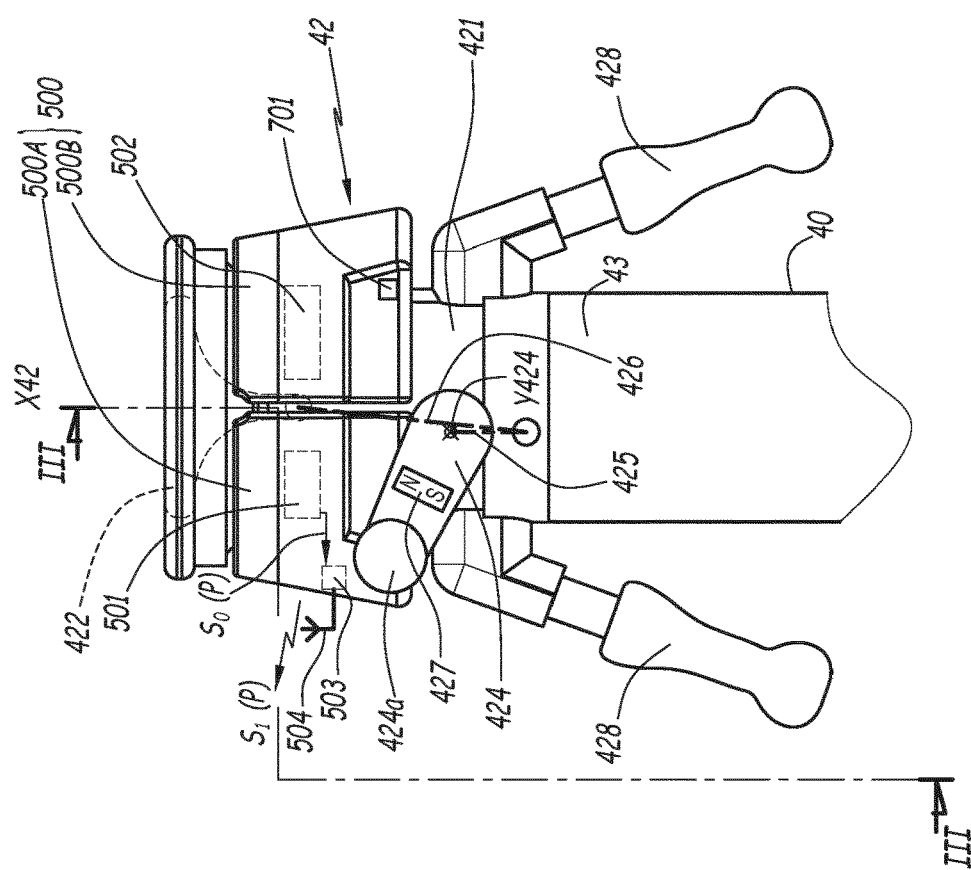

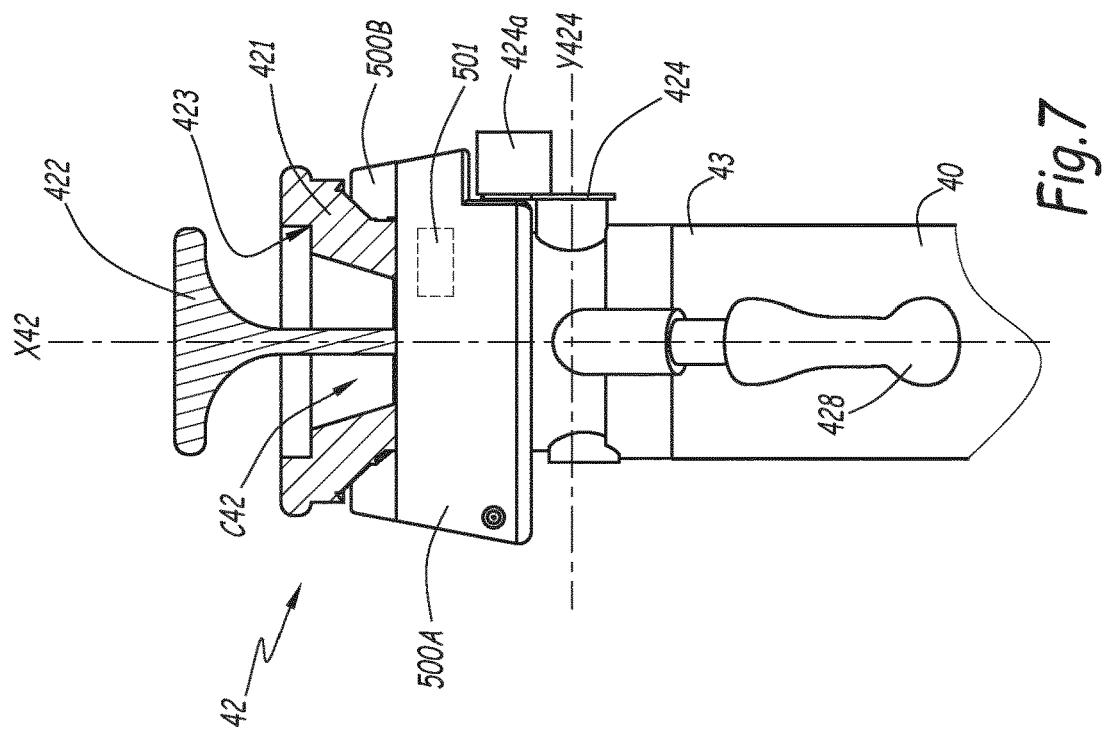
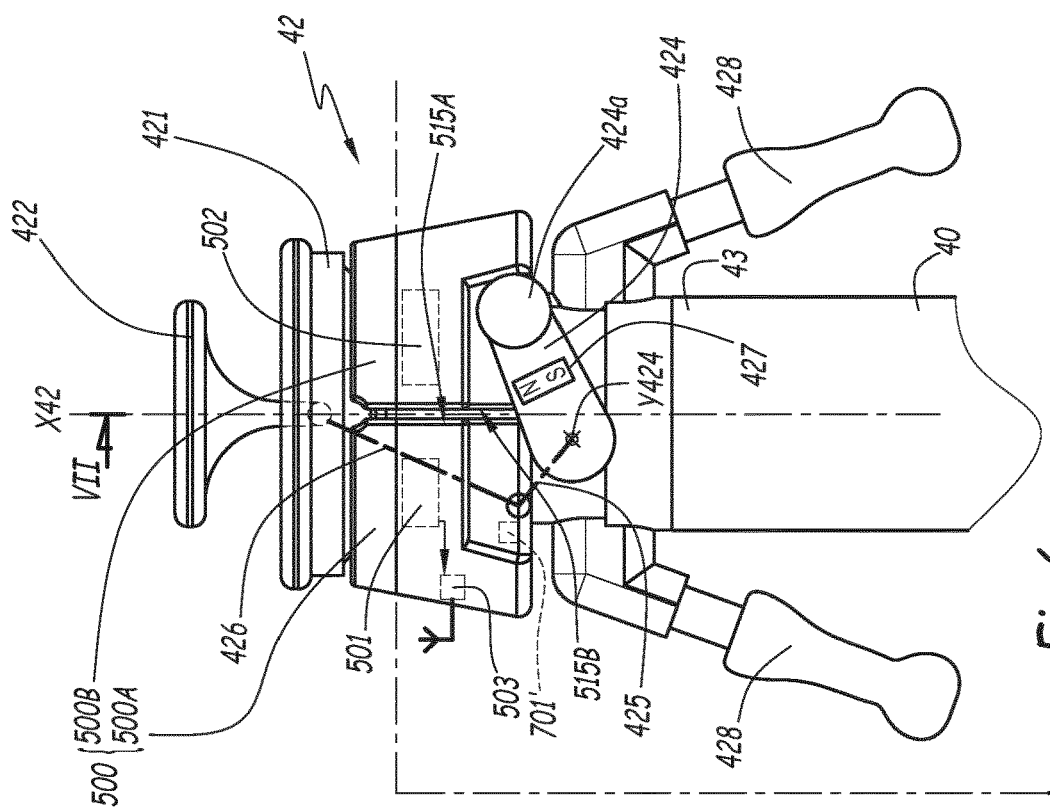

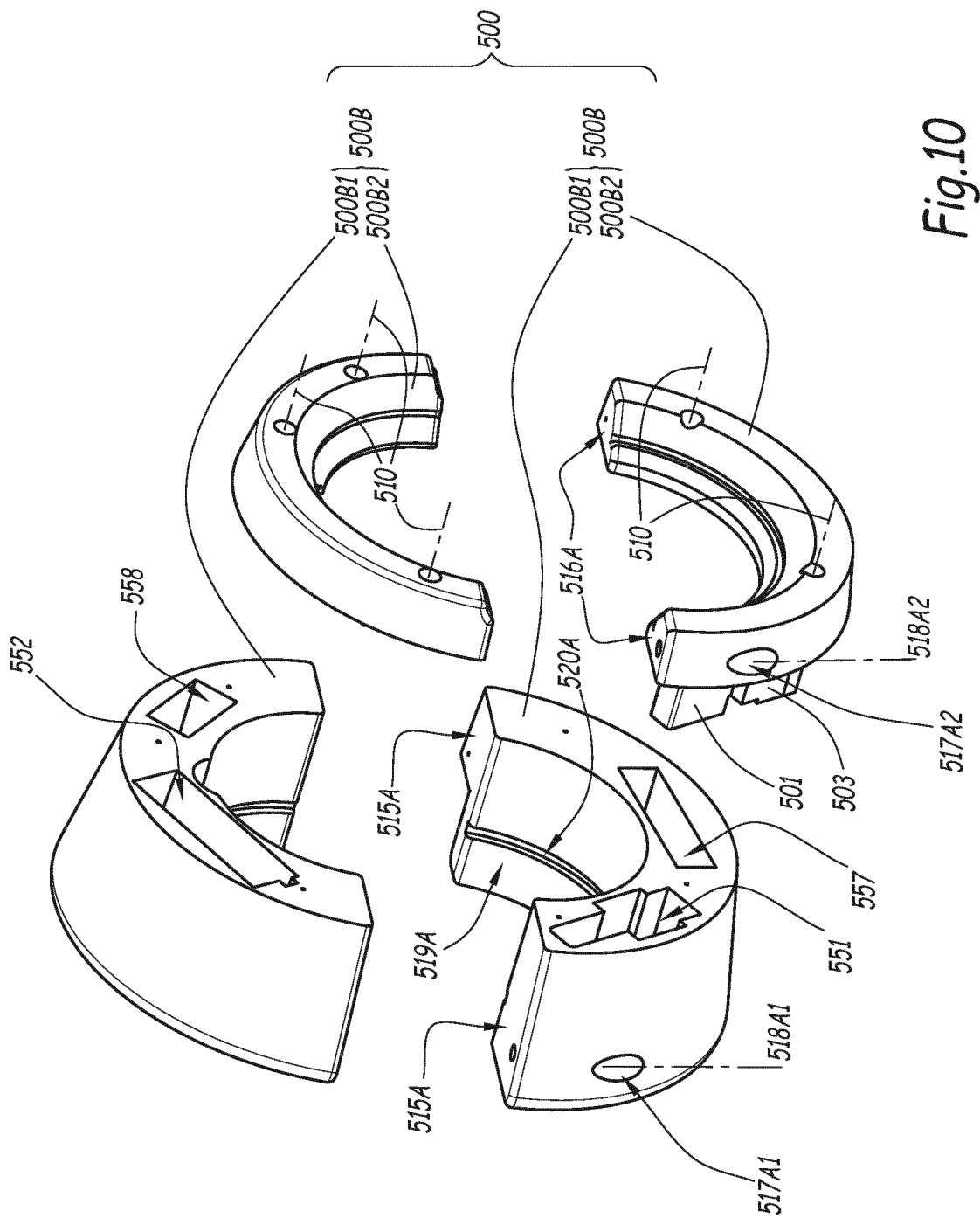

AIRCRAFT REFUELLING DEVICE AND METHOD FOR MANUFACTURING A WING COUPLING FOR SUCH A DEVICE

CROSS-REFERENCE TO RELATED APPLICATIONS

This application claims benefit under 35 USC § 371 of PCT Application No. PCT/EP2019/055443 entitled AIRCRAFT REFUELLING DEVICE AND METHOD FOR MANUFACTURING A WING COUPLING FOR SUCH A DEVICE, filed on Mar. 5, 2019 by inventor Claude Beck. PCT Application No. PCT/EP2019/055443 claims priority of French Patent Application No. 18 51927, filed on Mar. 6, 2018.

FIELD OF THE INVENTION

The invention relates to an aircraft refueling device as well as a method for manufacturing a wing coupling for such a refueling device.

BACKGROUND OF THE INVENTION

In civilian and military airports and aerodromes, it is known to use refueling devices that are moved close to aircraft in order to fill their tanks with fuel.

Thus, WO-A-2010/128246 discloses a refueling vehicle whereof the wing fastener is equipped with a sensor making it possible to determine the value a parameter, such as of the pressure, of a flow of fuel passing through this wing coupling. This device is satisfactory.

In a variant, the sensor can be used with one or several other parameters of the flow, in particular its temperature or its rate.

In this type of equipment, the sensor must be integrated into the wing coupling, while being mechanically protected from impacts and outside attacks, in particular sprays of rainwater or deicing products, for example.

Moreover, the wing couplings are equipment items for which the usage authorization is connected to very strict tests. It will be understood that the slightest structural technical modification to the body of a wing coupling or its internal mechanisms must be subject to in-depth evaluations, before any new use on aircraft.

SUMMARY OF THE DESCRIPTION

This is the issue that the present invention more particularly aims to address by proposing a new refueling device, the wing coupling of which includes a sensor, and which can be produced reliably and cost-effectively, without causing a structural modification of the body of the wing coupling or of its internal mechanisms.

To that end, the invention relates to an aircraft refueling device, this device comprising a pipe for the circulation of fuel, the downstream end of which is provided with a wing coupling for the connection thereof onto an intake port of an aircraft fuel tank. The wing coupling comprises a body, a sensor for measuring the value of a parameter representative of a flow of fuel passing through the wing coupling and at least one battery electrically powering this sensor. According to the invention, the sensor and the electrical power battery are housed in two half-shells mounted together around the body of the wing coupling.

Owing to the invention, the two half-shells can contain the elements necessary to implement the measuring sensor, that is to say the sensor itself and its electrical power battery. Thus, the function of measuring the value of the parameter is done in the form of a subassembly or module made up of two half-shells that may or may not be integrated into the wing coupling, depending on whether this function is necessary. This approach also makes it possible to equip the wing couplings with existing refueling devices, that is to say to "retrofit" these devices, particularly simply and without altering the mechanical and fluid properties of the body of the wing coupling.

According to advantageous, but optional aspects of the invention, such a refueling device may incorporate one or more of the following features, considered according to any technically allowable combination:

The sensor is mounted in a first half-shell and the battery is mounted in the second half-shell.

Electrical connection members between the sensor and the battery are provided in an interface area between the two half-shells.

The two half-shells are mounted removably around the body of the wing coupling.

The two half-shells are connected to one another by clamping members of these half-shells on the body of the wing coupling.

The two half-shells have a different color from that of the body of the wing coupling, in particular a fluorescent color.

A transmission module, toward a remote receiver, of a signal containing the value of the parameter measured by the sensor is also housed in one of the half-shells, which is made from a material that does not interfere with the signal transmitted by the transmission module, in particular made from a synthetic material, preferably made from plastic.

The refueling device also comprises at least one member for detecting the position of a front valve that is movable relative to the body, as well as an electrical or electronic system for sending the control unit a signal representative of the position of the front valve detected by the detection member, while the detection member and the transmission means are also each housed in one of the half-shells.

Each half-shell includes at least one hollow housing for the arrangement of one component among the sensor, the battery, and if applicable, the transmission module.

According to another aspect, the invention relates to a method for manufacturing a wing coupling for a refueling device as mentioned above. This method comprises a step consisting of mounting, around a body of the wing coupling, two half-shells in which are mounted the sensor for measuring the value of a parameter representative of the flow of fuel passing through this wing coupling, as well as the battery electrically powering this sensor.

BRIEF DESCRIPTION OF THE DRAWINGS

The invention will be better understood and other advantages thereof will appear more clearly in light of the following description of three embodiments of a refueling device and a manufacturing method according to the invention, provided solely as an example and done in reference to the appended drawings, in which:

FIG. 2 is an elevation view of a wing coupling and part of a fuel circulation pipe belonging to the refueling device shown in FIG. 1;

FIG. 3 is a partial axial sectional view along line III-III of FIG. 2;

FIG. 6 is a view similar to FIG. 2 when the wing coupling is in a second usage configuration;

FIG. 7 is a partial axial sectional view along line VII-VII of FIG. 6;

FIG. 10 is an exploded perspective view of a set of two half-shells belonging to the wing coupling of FIGS. 2 to 9;

DETAILED DESCRIPTION

Figure 1:
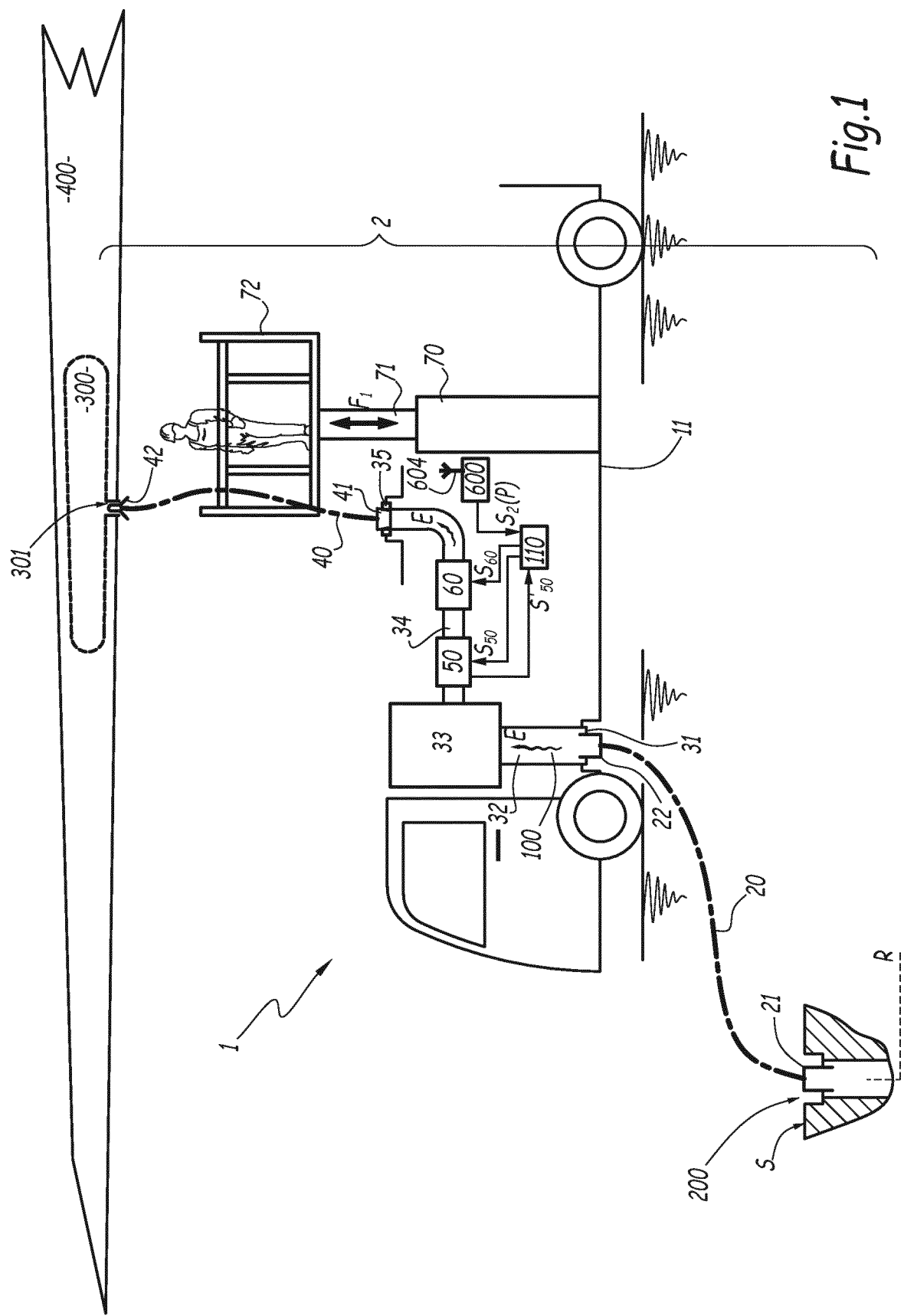
FIG. 1 is a schematic block diagram of a refueling vehicle including a refueling device according to the invention, during use to fill the tank of an aircraft with fuel.
Figure 5:
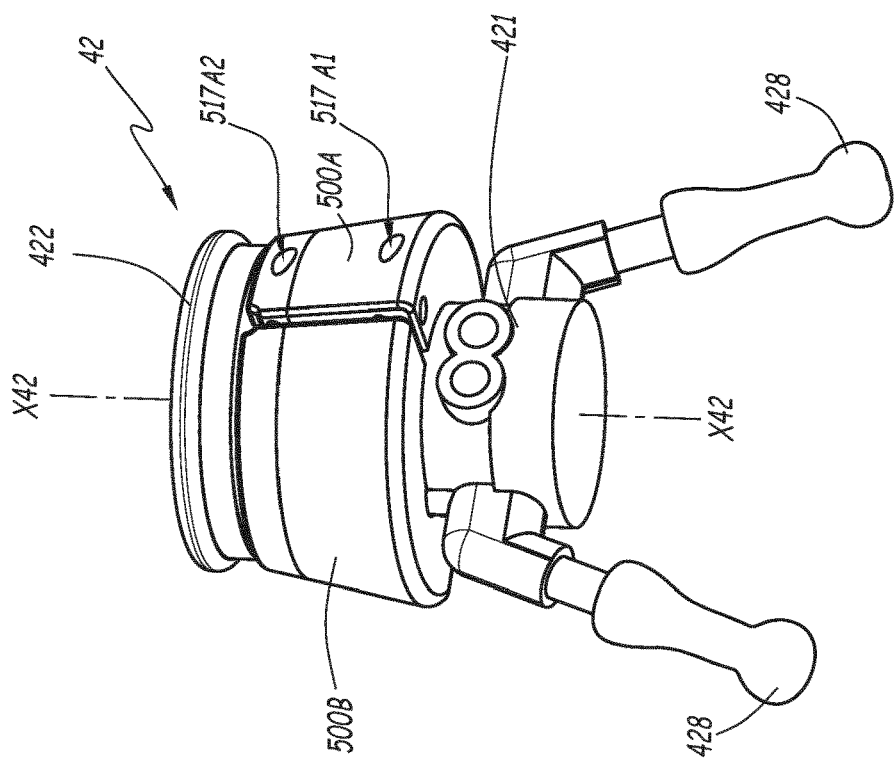
FIG. 5 is a perspective view from another angle of the wing coupling alone, in the configuration of FIGS. 2 to 4.
Figure 4:
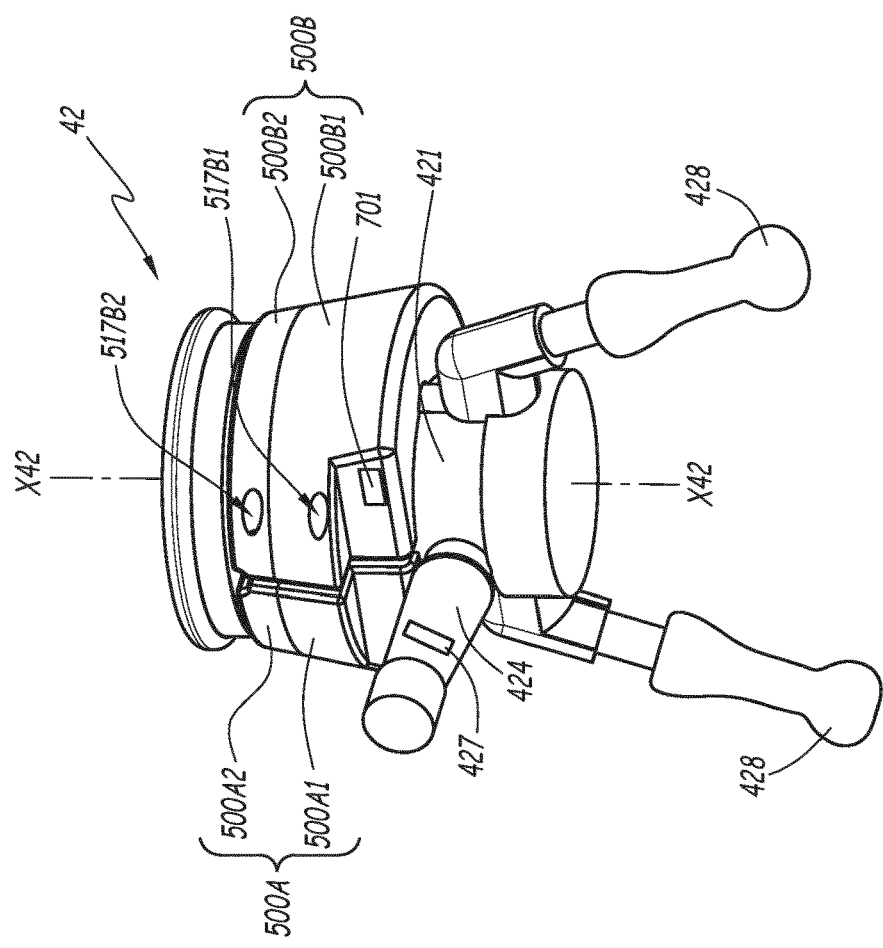
FIG. 4 is a perspective view of the wing coupling alone, in the configuration of FIGS. 2 and 3.
Figure 9:
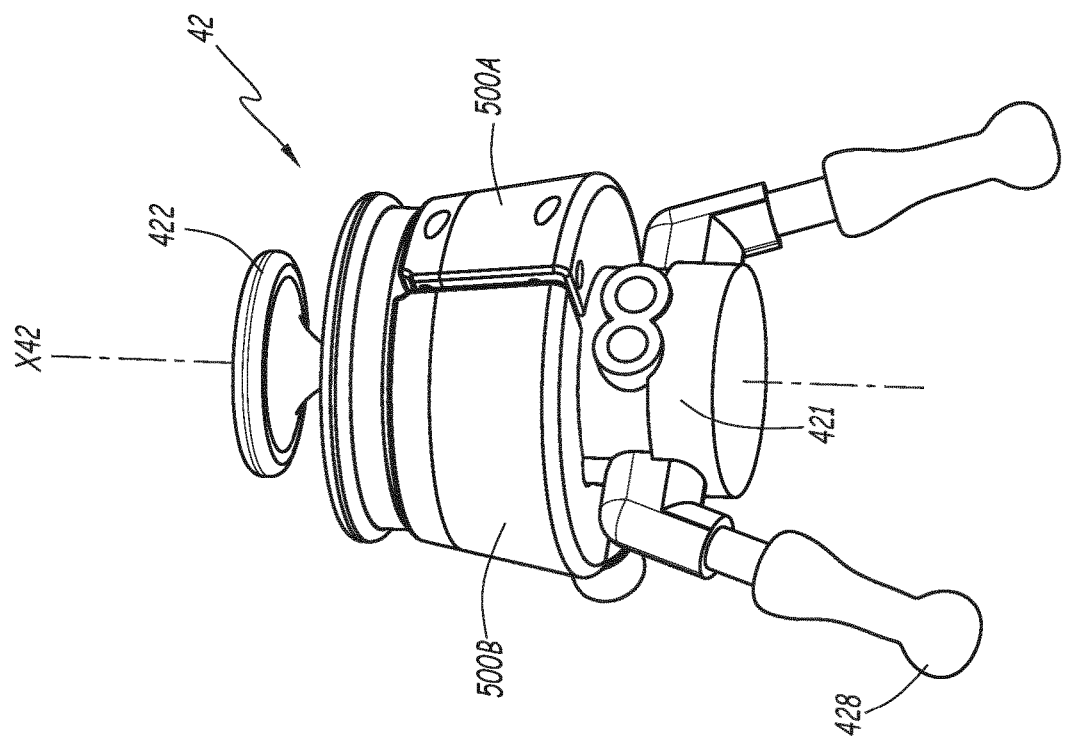
FIG. 9 is a perspective view from another angle of the wing coupling alone, in the configuration of FIGS. 6 to 8.
Figure 8:
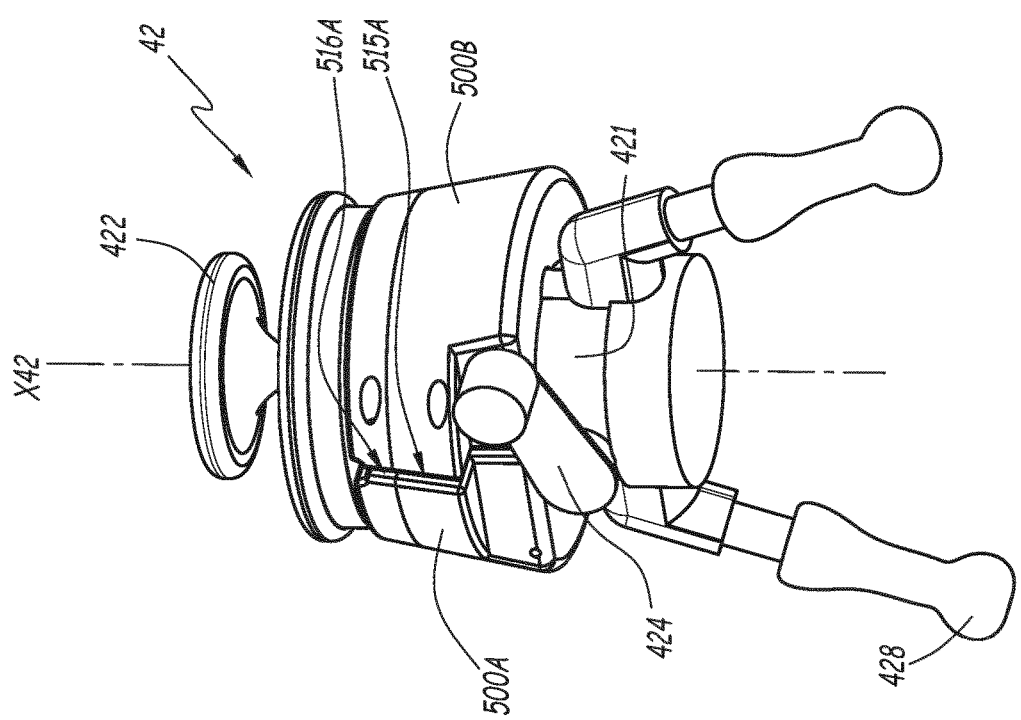
FIG. 8 is a perspective view of the wing coupling alone, in the configuration of FIGS. 6 and 7.
Figure 11:
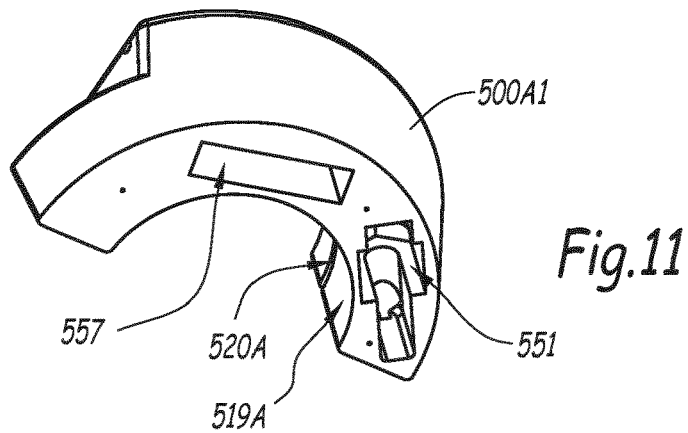
FIG. 11 is a perspective view from another angle of a first component of the set of two half-shells of FIG. 10.
Figure 12:
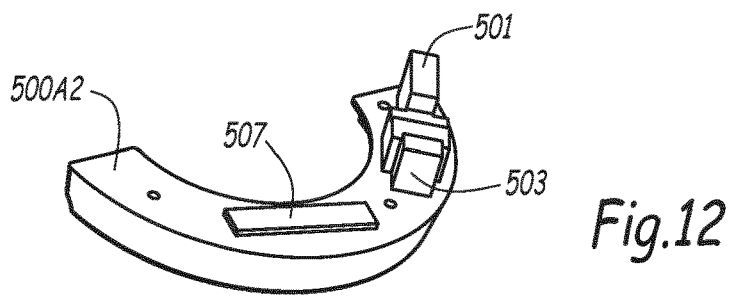
FIG. 12 is a perspective view from another angle of a second component of the set of two half-shells of FIG. 10.

The refueling vehicle or hydrant servicer 1 shown in FIG. 1 generally assumes the form of an industrial vehicle equipped with a flexible tubing 20, allowing it to be connected on an outlet mouth 200 belonging to a fixed fuel distribution network R in an airport. The mouth 200 is arranged below the surface S of the ground, near a parking location of an aircraft 400. The tubing 20 is equipped with a connector 21 for connecting on the mouth 200. At its end opposite the connector 21, the tubing 20 is equipped with another connector 22 for connecting on a connector 31 making up the mouth of a fixed pipe 32 of the vehicle 1. In other words, the tubing 20 makes it possible to connect the outlet mouth 200, which belongs to the fixed network R, to the pipe 32, which belongs to the vehicle 1.

The pipe 32 emerges in a filter 33 provided to rid the fuel of residues, in particular aqueous, that it may contain.

Downstream of the filter 33, a pipe 34 extends to a connector 35 on which is connected an upstream connector 41 of a second flexible tubing 40. A wing coupling 42 is connected on the downstream end 43 of the second flexible tubing 40 and constitutes a means for connecting the tubing 40 on an inlet port 301 of a tank 300 integrated into the wing 400 of an airplane.

According to one optional aspect of the invention that is not shown for the clarity of the drawing, but which is typical in practice, a lining of the second flexible tubing 40 and the wing coupling 42 can be considered.

For the clarity of the drawings, the flexible tubings 20 and 40 are shown, in FIG. 1, by axis lines corresponding to their respective longitudinal axes.

The parts 20 to 42 belong to a refueling device 2 that is part of the vehicle 1.

The wing coupling 42 comprises a cylindrical body 421 equipped with a ring, not shown and known in itself, preferably with international profile ISO45 allowing it to be locked by shape cooperation on a corresponding connector, also not shown and known in itself, delimiting the port 301. The wing coupling 42 is also provided with a so-called front valve 422, which is translatable along the longitudinal axis X42 of the wing fastener 42, between a first closed position shown in FIGS. 2 to 5, where this front valve 422 bears against a seat 423 formed by the body 421, and a second open position shown in FIGS. 6 to 9, where the front valve 422 is separated from the seat 423.

In its first closed position, the front valve 422 prevents the flow of fuel from the flexible tubing 40 toward the tank 300. In its second open position, the front valve 422 allows such a flow, in particular within a channel C42 defined inside the body 421 around the front valve 422.

The maneuvering of the front valve 422 between its first and second positions is done using a lever 424 that is mounted pivoting on the body 421 about an axis Y424 perpendicular to the longitudinal axis X42. The lever 424 is movable about the axis Y424 between the two extreme positions shown in FIGS. 2 to 5 on the one hand, and in FIGS. 6 to 9 on the other hand. A set of articulated connecting rods 425 and 426, shown very schematically, transparently, in FIGS. 2 and 6, connects the lever 424 to the valve 422 and converts the rotational movement of the lever 424, about the axis Y424, into a translational movement of the front valve, along the axis X42.

Here, the technical teaching of U.S. Pat. No. 4,567,924 can be used, which is incorporated into this disclosure by reference. Other systems for transmitting movement between the lever 424 and the front valve 422 are also conceivable.

The lever 424 is equipped with a gripping handle 424a, which makes it possible to exert torque for rotating this lever about the axis Y424.

The body 421 is in turn equipped with two manipulating handles 428, which allow an operator to bring it closer to the port 301 or to move it away therefrom, respectively at the beginning and the end of refueling. The wing coupling 42 is locked on the port 301 and unlocked relative to the latter by rotation about the axis X42, respectively at the beginning and the end of refueling.

In a variant, the two handles 428 are replaced by a wheel.

The elements 32 to 34 together define a fixed flow path for the fuel, between two flexible lines respectively made by the tubings 20 and 40. This fixed flow path and these flexible lines extend between the connector 21 for connecting on the network R and the wing coupling 42 for connecting on the port 301, within the refueling device 2.

Reference E denotes the flow of fuel between the mouth 200 and the tank 300.

The refueling device 2 is equipped with a meter 50 that makes it possible to measure the quantity of fuel passing through the pipe 34 due to the flow E, that is to say the quantity of fuel delivered to the tank 300. The refueling device 2 also includes a pressure regulator 60, which makes it possible to monitor the pressure of the flow E in the downstream portion of the pipe 34.

An electronic unit 110 belonging to the refueling device 2 is mounted on the chassis of the vehicle 1 and monitors, through suitable electronic signals $S_{50}$ and $S_{60}$, respectively the meter 50 and the pressure regulator 60. The meter 50 in turn provides the unit 110 with a signal $S'_{50}$ representative of the counting that it performs.

The vehicle 1 bears a hydraulic jack 70, the rod 71 of which is equipped with a platform 72 on which an operator stands, who can manipulate the downstream part of the tubing 40, in particular the wing coupling 42. The rod 71 allows the operator, through his upward or downward vertical movement shown by the double arrow $F_1$, to access the intake port 301.

A module 500, which also belongs to the refueling device 2, is placed around the body 421 of the wing coupling 42. This module 500 assumes the form of two half-shells 500A and 500B that grip the body 421. The module 500 comprises a cell 501 for measuring the pressure of the flow E just before leaving the wing coupling 42. The cell 501 is housed in the half-shell 500A.

Given the location of the module 500, which is in the immediate vicinity of the wing coupling 42, the cell 501 makes it possible to determine, with a satisfactory degree of precision, the pressure of the flow E when it enters the tank 300, through the port 301. In other words, the location of the module 500, at the connecting means formed by the wing coupling 42, allows the cell 501 to provide a representative value of the pressure of the flow E passing through the wing coupling 42 when it enters the tank 300. The cell 501 to that end forms a sensor for measuring the value of this pressure.

In the example, the module 500 is near the front valve 422, such that the distance between the cell 501 and the transfer point of the fuel from the refueling system to the aircraft is less than 10 cm. The transfer point of the fuel is defined at the outlet of the wing coupling 42 as the point where the ownership of the fuel passes from the company supplying the fuel to the company operating the aircraft.

The cell 501 is supplied with electrical energy from a battery 502, housed in the half-shell 500B. Electrical conductors, not shown, extend between the two half-shells 500A and 500B to connect the cell 501 and the battery 502 to one another.

The cell 501 is electrically connected to a radio transmitter 503 also housed in the half-shell 500A and powered by the battery 502. The cell 501 provides the transmitter 503 with an electronic signal $S_0(P)$ corresponding to the value of the pressure that it measures.

The transmitter 503 is equipped with an antenna 504 that allows it to transmit a wireless signal $S_1(P)$ including data corresponding to the value of the pressure P measured by the cell 501. As an example, the transmission mode of the signal $S_1(P)$ can be provided by radiofrequency, but in a variant, it can be done by infrared. The half-shell 500A contains the electronic components for measuring and transmitting data, respectively formed by the cell 501 and the transmitter 503. This half-shell 500A also contains an electronic board 507 for controlling the elements 501 and 503. To that end, the half-shell 500A can be described as "electronic half-shell" because it comprises the electronic measuring and transmission elements.

In turn, the half-shell 500B includes power elements formed on the one hand by the battery 502 and on the other hand by an electronic board 508 for regulating the electrical power delivered by the battery 502. To that end, the half-shell 500B can be described as "power half-shell".

The electronic half-shell 500A has two parts. It comprises a main part 500A1 that defines a first hollow housing 551 in which the electronic components 501 and 503 are arranged and a second hollow housing 557 in which the electronic board 507 is arranged. The half-shell 500A also comprises a cover 500A2 on which the components 501, 503 and 507 are mounted. The assembly of the half-shell 500A is done by pressing the cover 500A2 on the main part 500A1 in an insertion position of the electronic components 501, 503 and 507 respectively in the housings 551 and 557.

The component material of the main part 500A1 is chosen so that the latter does not disrupt the signal $S_1(P)$ transmitted by the transmitter 503. This material can be a synthetic material, preferably a plastic, such as additivated polyurethane withstanding outside attacks, such as UV rays, compatible with hydrocarbons mechanically withstanding impacts.

Figure 13:
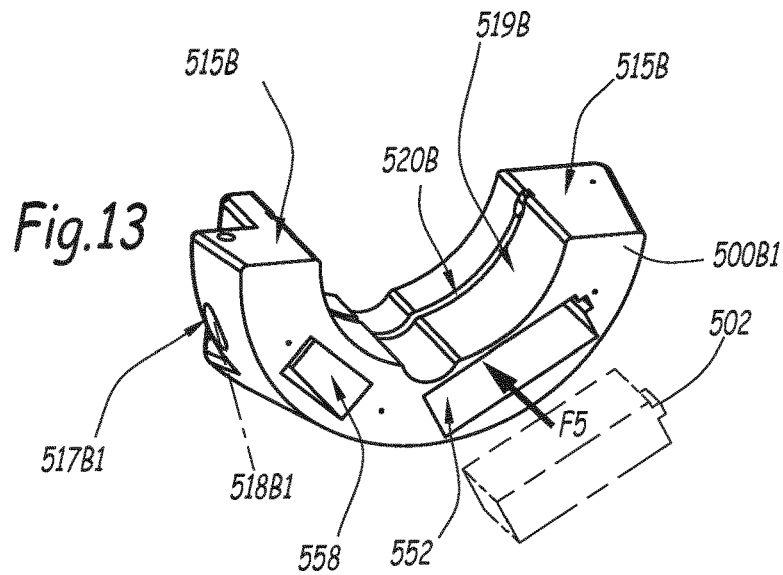
FIG. 13 is a perspective view from another angle of a third component of the set of two half-shells of FIG. 10.

The power half-shell 500B also has two parts and comprises a main part 500B1 and a cover 500B2. The main part 500B1 comprises a first hollow housing 552 in which the battery 502 is arranged and a second hollow housing 558 in which the electronic board 508 is arranged. The battery 502 is shown in mixed lines in FIG. 13, opposite its location 552. The assembly of the half-shell 500B takes place by introducing the battery 502 into the housing 552, in the direction of the arrow F5 in FIG. 13, then by pressing the cover 500B2 on the main part 500B1 in a configuration engaging the electronic board 508 in the housing 558.

The component material of the main part 500B1 can be chosen to effectively protect the battery 502 and the electronic board 508 from impacts. It may in particular be metal or a synthetic material filled with fibers, for example glass fibers.

The material of the covers 500A2 and 500B2 can be the same as that of the main part with which they are associated, or a different material.

In all cases, the material(s) selected to make up the parts 500A1, 500A2, 500B1 and 500B2 are chosen to withstand impacts, hydrocarbons and ultraviolet rays.

The covers 500A2 and 500B2 are respectively fastened on the main parts 500A1 and 500B1 using screws 510 shown by their respective axis lines in FIG. 10.

In the assembled configuration of the module 500 around the body 421, the half-shells 500A and 500B each respectively extend over about 180° around the longitudinal axis X42 and each assume the form of a half-ring.

The electronic half-shell 500A defines four elementary surfaces, including two elementary surfaces 515A defined by the main part 500A1 and two elementary surfaces 516A defined by the cover 500A2. These elementary surfaces are planar and aligned with one another in the mounted configuration of the half-shell 500A. Likewise, the half-shell 500B2 defines four elementary surfaces that are planar and aligned with one another in the mounted configuration, namely two elementary surfaces 515B formed by the main part 500B1 and two elementary surfaces 516B defined by the cover 516B2.

In the assembled configuration of the module 500 around the body 421, the surfaces 515A are parallel to the axis X42 and positioned across from the surfaces 515B, while the surfaces 516A are parallel to the axis X42 and positioned across from the surfaces 516B.

Figure 14:
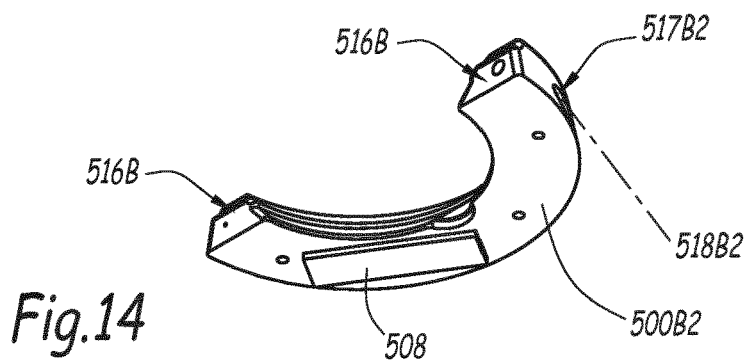
FIG. 14 is a perspective view from another angle of a fourth component of the set of two half-shells of FIG. 10.

The assembly of the half-shells 500A and 500B around the body 421 is done using screws 518A1 and 518B1 that are respectively engaged in housings 517A1 and 517B1 provided on the main parts 500A1 and 500B1, these screws 518A1 and 518B1 passing through the surfaces 515A and 515B to penetrate the opposite half-shell. The assembly of the half-shells 500A and 500B around the body 421 is also done using screws 518A2 and 518B2 that are respectively engaged in housings 517A2 and 517B2 respectively provided on the covers 500A2 and 500B2, these screws 518A2 and 518B2 passing through the surfaces 516A and 516B to penetrate the opposite half-shell. The screws 518A1, 518A2, 518B1 and 518B2 are shown by their respective axis lines in FIGS. 10, 13 and 14.

In a variant, the half-shells 500A and 500B can be secured to one another around the body 421 by shape cooperation. The assembly of the half-shells 500A and 500B to one another by the screws has the advantage of being removable, in other words reversible, which facilitates the maintenance operations of the wing coupling 42.

The screws further have the advantage of allowing clamping of the half-shells 500A and 500B around the body 421.

The assembly of the half-shells 500A and 500B around the body 421 modifies the outside appearance of the wing coupling 42, which makes it possible at a glance to differentiate a wing coupling 42 equipped with a cell 501 for measuring the pressure of the flow E from a wing coupling without such as cell.

Furthermore, in order to facilitate this identification, the elements 500A1, 500A2, 500B1 and 500B2 can be painted or made from a colored material, with a color different from that of the body 421, in particular a fluorescent color. This makes the module 500 even more visible. This draws the attention of the operator to the fact that the wing coupling 42 thus equipped must be handled with certain precautions, so as not to damage the electronic components 501, 503 and 507 and the power components 502 and 508.

Electrical conductors extend within and between the half-shells 500A and 500B so as to connect the power source formed by the battery 502 to the electrical charges formed by the sensor 501, the transmitter 503 and the electronic boards 507 and 508. These electrical cables are not shown, for clarity of the drawing.

Electrical connection means between the cell 501 and the battery 502 are provided at the interface between the half-shells 500A and 500B, in particular at the surfaces 515A and 515B. These electrical connection means are not shown, for clarity of the drawing. They may be outlets or pins known in themselves. The current circulating in these wires is extremely weak, since a limiting device exists at the beginning of the cells or rechargeable battery. Preferably, the energy level circulating in these conductive wires electrically connecting each half-shell does not allow the production of a spark whose energy could ignite an explosive atmosphere.

On their respective inner radial surfaces 519A and 519B, the main parts 500A1 and 500B1 are each provided with a groove 520A, 520B for receiving an electrical conductor that is not shown, but which may serve as the connection between the battery 502 and its current limiting device on the one hand, and the other components or the electrical connection between these components on the other hand. In a variant or additionally, a groove of the same type can be provided on the inner radial surface of a cover 500A2 or 500B2.

Electrical connection means between the cell 501 and the battery 502 are provided at the interface between the half-shells 500A and 500B, in particular at the surfaces 515A and 515B. These electrical connection means are not shown, for clarity of the drawing. They may be outlets or pins known in themselves.

Furthermore, the refueling device is equipped with a receiver 600 paired to the module 500 and the antenna 604 of which allows it to receive the signal $S_1(P)$.

The receiver 600 is then able to send the electronic control unit 110 a signal $S_2(P)$ representative of the pressure P of the flow E detected by the cell 501.

The unit 110 can then account for the value of this pressure P in particular in order to control the pressure regulator 60 using the appropriate electronic signal $S_{60}$.

In order for the pressure sensor formed by the cell 501 to work effectively, it must be supplied with electrical energy with a sufficient level, from the battery 502. Thus, the level of this battery 502 is critical for the operation of the vehicle 1.

In order to prevent the battery 502 from depleting when the wing coupling is not in use, and accounting for the fact that the cell 501 must only be powered when a flow E is actually passing through the wing fastener 42, it is possible to provide for making the power supply of the cell 501 by the battery subject to the existence of such a flow E.

Taking this approach into account, the wing coupling 42 is equipped with a member 701 for detecting the position of the valve 42, which makes it possible to deduce whether a flow E may have taken place through the wing coupling 42, since the position of the front valve 422 determines the possibility of such a flow.

The detection member 701 is integrated into the half-shell 500B and positioned to indirectly detect the position of the front valve 422 by detecting the position of the lever 424. Indeed, since the kinematic link between the lever 424 and the valve 422 is unique, owing to the connecting rods 425 and 426, it suffices to identify the position of the lever 424 to deduce that of the front valve 422 therefrom.

This takes advantage of the fact that, during the manipulation of the wing coupling 422, the operator is meant to maneuver the lever 424 in order to move the valve 422 between its first and second positions, at the beginning of refueling, then between its second and first positions, at the end of refueling.

The detection member 701 can be formed by a proximity sensor capable of reacting to the presence of the lever 424 in its immediate environment. This proximity sensor can comprise an electrical contact, preferably a dry electrical contact, capable of reacting to the presence of a magnetic member such as a permanent magnet 427 mounted on the lever 424. For example, a reed switch forms the detection member 701 and is inserted in an electrical line connected to an electronic control unit, chosen among the electronic units 507 and 508 or made up of an independent unit. The reed switch 701 can assume an open configuration or a closed configuration, depending on the presence or absence of the magnet 427 in its vicinity.

An electrical signal S701 is considered that is representative of the state of the reed switch 701. This electrical signal S701 is equal to zero when the switch is open and it assumes a nonzero value, equal to the intensity of the current circulating in the aforementioned electrical line, when the switch 701 is closed. This electrical signal S701 can be used, by the electronic control unit 507 or 508 or the like, to power the cell 501 only when the signal S701 is nonzero, that is to say when the lever 424 is in a position corresponding to the second position of the front valve 422.

The electronic control unit 505 can use the same rules to power or not power the transmitter 503, which also consumes current.

The use of a reed switch 701 is particularly advantageous, since such a switch forms a detection member that does not consume current in itself. However, other types of members for detecting the position of the lever 424 can be considered, for example based on a magnetic or inductive effect, in particular from a Hall effect sensor.

In the example of FIGS. 1 to 14, the reed switch 701 is positioned in the half-shell 500B, such that it detects the lever 424 when the latter is in a position corresponding to the second position of the front valve 422.

Another configuration is possible, however, as shown in mixed lines in FIG. 6, where another reed switch 701' is positioned in the half-shell 500A, near the lever 424 when the latter is in a configuration corresponding to the first position of the front valve 422.

According to another variant, it is possible to provide two members for detecting the position of the front valve, such as the switches 701 and 701', respectively in the vicinity of each of the two extreme positions of the travel of the lever 424 that respectively correspond to the first and second positions of the front valve 422.

Figure 15:
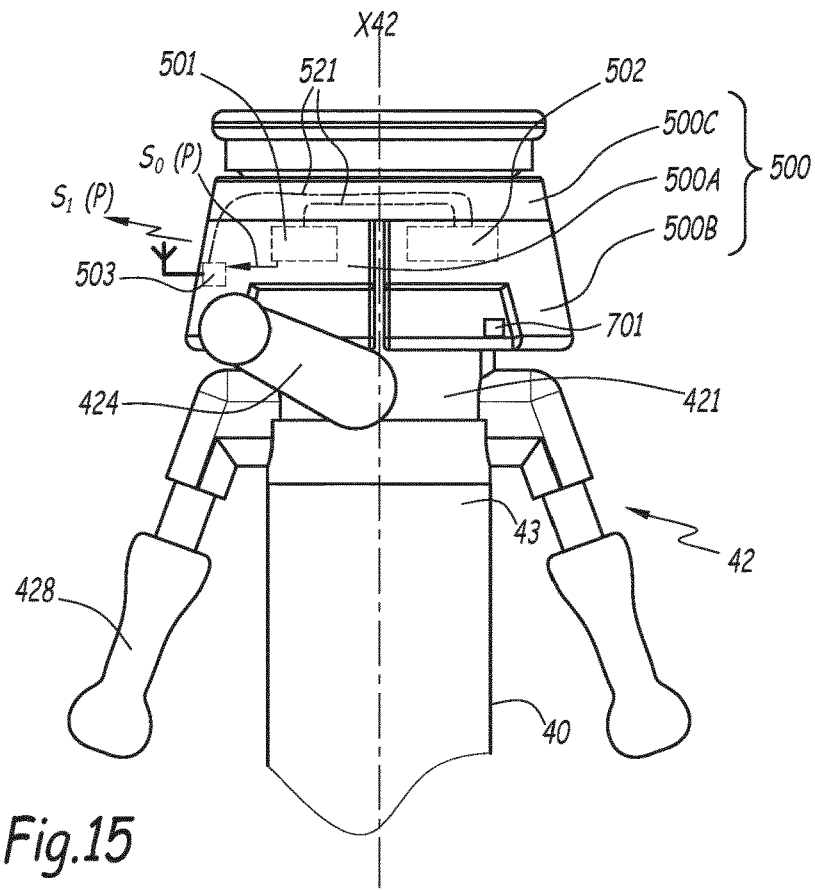
FIG. 15 is a view similar to FIG. 2, for a device according to a second embodiment of the invention.
Figure 16:
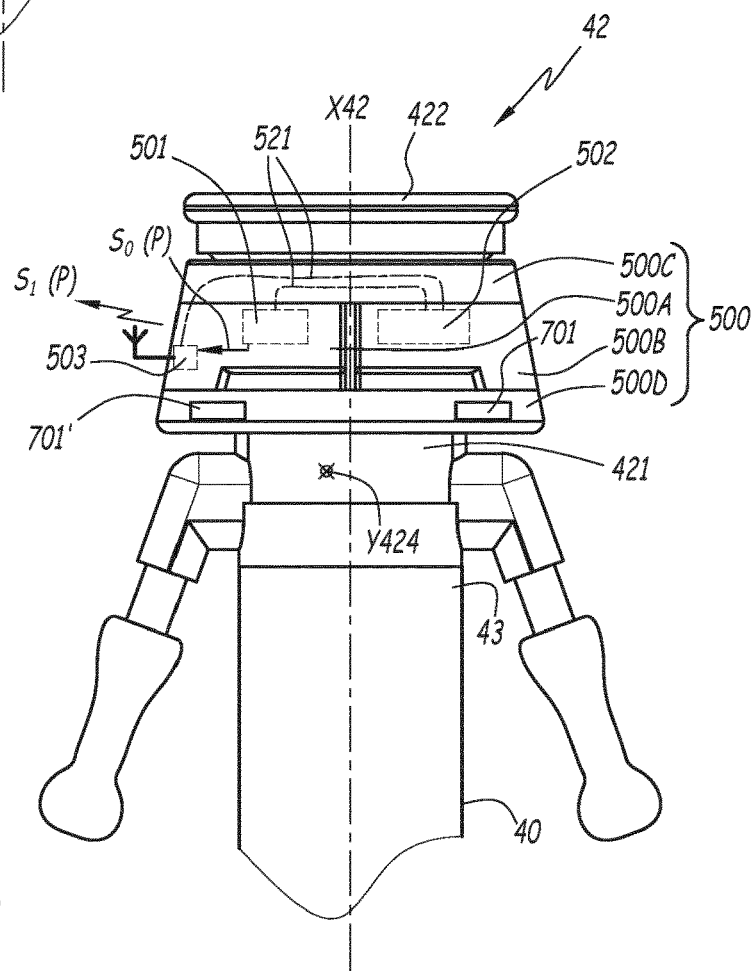
FIG. 16 is a view similar to FIG. 2, for a device according to a third embodiment of the invention, the lever for controlling the position of the front valve being omitted for the clarity of the drawing.

In the second and third embodiments of the invention respectively shown in FIGS. 15 and 16, the elements similar to those of the first embodiment bear the same references. In the following, we describe how these embodiments differ from the previous one.

In the second embodiment of FIG. 15, the two half-shells 500A and 500B are monobloc and formed exclusively by parts that are respectively similar to the main parts 500A1 and 500B1 of the first embodiment. Two covers are used, with a geometry close to that of the covers 500A2 and 500B2, but while being rotated by 90° about the axis X42 relative to the configuration of the covers of the first embodiment. Only one of these two covers is visible in FIG. 15 with reference 500C. Thus positioned, each of the covers 500C constitutes a bridge arranged straddling the two half-shells 500A and 500B. These covers 500C perform a function of tightly closing the half-shells 500A and 500B, like in the first embodiment, while participating in reliabilizing the mechanical assembly between these parts, since they can be screwed by the screws 510 each both in the half-shell 500A and in the half-shell 500B. Furthermore, electrically conductive cables 521 can travel inside these covers 500C, between the half-shells 500A and 500B, without being exposed to the outside. The covers 500C also belong to the module 500, defined like in the first embodiment, in addition to the half-shells 500A and 500B.

Like in FIG. 16, the control lever for the position of the front valve 422 of the refueling device of the third embodiment, which corresponds to the control lever 424 of the other embodiments, is omitted, for the clarity of the drawing. In this third embodiment, covers 500 are used like in the second embodiment, as well as two bases, only one of which is visible in FIG. 16 with reference 500D. The bases 500D are positioned so as to correspond to the covers 500C, straddling the half-shells 500A and 500B, which again makes it possible to mechanically connect the half-shells 500A and 500B, or to circulate electrically conductive cables. The covers 500C and the bases 500D also belong to the module 500, defined like in the first embodiment, in addition to the half-shells 500A and 500B.

In this case, the detection member(s) 701 and 701' are advantageously integrated into one of the bases 500D. Electrically conductive cables, connecting this or these detection member(s) to the associated electronic boards, can circulate in the base 500D in question. In the example of FIG. 16, two switches 701 and 701' forming detection members are used and mounted in the base 500D. In a variant, only one such switch is used and mounted on this base.

Mounting the switch(es) 701 and/or 701' on a base 500D makes their use optional. Indeed, if a member for detecting the position of the front valve 422 is needed, a base 500D equipped with reed switches can be used. Otherwise, a base without such switches can be used.

In the second and third embodiments, the covers 500C, and optionally the bases 500D, can be solid and comprise channels for the circulation of tracks are conductive wires connecting electronic components and/or the battery 502 to one another. Furthermore, electronic components can be mounted in these parts 500C and 500D. This in particular relates to the switches 701 and 701' as considered above, without being limited to these components alone.

In the second and third embodiments, the two covers 500C, and if applicable the two bases 500D, can be monobloc. In this case, the module 500 of the second embodiment is formed in three pieces, instead of four in the version mentioned above, and that of the third embodiment is formed in four pieces, instead of six in the version mentioned above.

In a variant, one of the covers 500C, the sole cover 500C, one of the bases 500D or the sole base 500D, can incorporate an RFID code reader.

According to another variant, one of the covers 500C, the sole cover 500C, one of the bases 500D or the sole base 500D, can incorporate one or several antennas, in particular the antenna 504.

The parts 500A, 500B, 500C and 500D can be solid, with only the housings 551, 552, 557, 558 and equivalent, or open-worked with hollow volumes defined around these housings. In this last case, the hollow volumes are advantageously filled in with a filler material, of the silicone or elastomer type, so as to prevent the accumulation of a potentially explosive atmosphere.

According to another variant that is not shown, the transmitter 503 can be off-loaded into a base 500D. In this case, the component material of the half-shell 500A can be chosen without restriction regarding the disruption of the waves emitted by this transmitter, since this transmitter is located outside this half-shell. The material of the base 500D is then adapted accordingly.

According to another variant of the invention that is not shown, the two half-shells 500A and 500B can be devoid of cover and base. In this case, the different electronic measuring, transmission or power components can be immobilized in corresponding housings, provided in these half-shells and which emerge to the outside, by injecting a polymerizable resin into these housings and around these components.

Indeed, this technique for immobilizing the components in the corresponding housings can be implemented in the three embodiments shown in the figures, before placing the covers 500A2, 500B2, 500C or bases 500D.

Irrespective of the embodiment, a method for manufacturing a wing coupling 42 comprises, aside from steps for molding/machining the body 421 and mounting accessories 422, 424 and 426 on this body, a step for mounting, around this body 421, two half-shells 500A and 500B.

Due to this mounting step, the integration of the cell 501 and the battery 502 into the two half-shells 500A and 500B makes it possible to add the function of controlling the pressure P, on a new wing coupling or on a wing coupling that is already in use, in the context of retrofitting, without having to modify the body 421, the front valve 422 or the handles 426.

In the examples mentioned above, the parameter detected owing to the cell 501 is the pressure P of the flow E. In a variant, one or several other parameters representative of the flow E passing through the wing coupling 42 can be measured, in particular its temperature T, its rate Q or the volume V that passes through this wing coupling from a predetermined instant, as well as its density, its mass or its turbidity.

The invention is described above in the case where the refueling device 2 is mounted on the vehicle 1 and connected to a fuel supply network. However, it is applicable to the case where this device is mounted in a fixed station. It is also applicable to the case where the vehicle 1 is a bowser equipped with a fuel tank and a pump.

The features of the embodiments and variants considered above may be combined with one another to generate new embodiments of the invention.

The invention claimed is:

1. An aircraft refueling device comprising a pipe for the circulation of fuel, the downstream end of which is provided with a wing coupling for connection thereof onto an intake port of an aircraft fuel tank, the wing coupling comprising:
   a body;
   a sensor for measuring the value of a parameter representative of a flow of fuel passing through said wing coupling; and
   at least one battery electrically powering said sensor, wherein said sensor and said at least one battery are housed in two half-shells mounted together around said body of said wing coupling.

2. The refueling device according to claim 1, wherein said sensor is mounted in a first one of said two half-shells, and said at least one battery is mounted in a second one of said two half-shells.

3. The refueling device according to claim 2, wherein electrical connection members between said sensor and said at least one battery are provided in an interface area between said two half-shells.

4. The refueling device according to claim 1, wherein said two half-shells are mounted removably around said body of said wing coupling.

5. The refueling device according to claim 1, wherein said two half-shells are connected to one another by clamping members of said two half-shells on said body of said wing coupling.

6. The refueling device according to claim 1, further comprising a transmission module, toward a remote receiver, of a signal containing the value of the parameter measured by said sensor, the transmission module being housed in one of said two half-shells which is made from a material that does not interfere with the signal transmitted by said transmission module.

7. The refueling device according to claim 6, wherein said transmission module is housed in one of said two half-shells which is made from a synthetic material.

8. The refueling device according to claim 7, wherein said transmission module is housed in one of said two half-shells which is made from plastic.

9. The refueling device according to claim 1, further comprising:
   at least one detection member for detecting the position of a front valve that is movable relative to said body of said wing coupling; and
   an electrical or electronic system for sending a control unit a signal representative of the position of the front valve detected by said at least one detection member, wherein said at least one detection member and said transmission module are each housed in one of said two half-shells.

10. The refueling device according to claim 1, wherein each of said two half-shells comprises at least one hollow housing for arrangement of one component among said sensor, said at least one battery and, if applicable, said transmission module.

11. A method for manufacturing a wing coupling for a refueling device according to claim 1, the method comprising mounting, around a body of the wing coupling, two half-shells in which are mounted the sensor and the at least one battery electrically powering the sensor.

* * * * *